O. W. RANDOLPH.
GRAIN DRYING AND SALVAGING RAILWAY CAR.
APPLICATION FILED JULY 2, 1917.

1,262,842.

Patented Apr. 16, 1918.
7 SHEETS—SHEET 1.

Inventor
Oliver W. Randolph
by Robt. B. Wilson
Attorney

O. W. RANDOLPH.
GRAIN DRYING AND SALVAGING RAILWAY CAR.
APPLICATION FILED JULY 2, 1917.

1,262,842.

Patented Apr. 16, 1918.
7 SHEETS—SHEET 4.

Inventor
Oliver W. Randolph
by Robt. B. Wilson
Attorney

O. W. RANDOLPH.
GRAIN DRYING AND SALVAGING RAILWAY CAR.
APPLICATION FILED JULY 2, 1917.

1,262,842.

Patented Apr. 16, 1918.
7 SHEETS—SHEET 5.

O. W. RANDOLPH.
GRAIN DRYING AND SALVAGING RAILWAY CAR.
APPLICATION FILED JULY 2, 1917.

1,262,842.

Patented Apr. 16, 1918.
7 SHEETS—SHEET 6.

Inventor
Oliver W Randolph
by Rob't B Wilson
Attorney

O. W. RANDOLPH.
GRAIN DRYING AND SALVAGING RAILWAY CAR.
APPLICATION FILED JULY 2, 1917.

1,262,842.

Patented Apr. 16, 1918.
7 SHEETS—SHEET 7.

Inventor
Oliver W. Randolph
by Robt B Wilson
Attorney

UNITED STATES PATENT OFFICE.

OLIVER W. RANDOLPH, OF TOLEDO, OHIO.

GRAIN DRYING AND SALVAGING RAILWAY-CAR.

1,262,842.  Specification of Letters Patent.  Patented Apr. 16, 1918.

Application filed July 2, 1917. Serial No. 178,126.

*To all whom it may concern:*

Be it known that I, OLIVER W. RANDOLPH, a citizen of the United States, residing at Toledo, in the county of Lucas and State of Ohio, have invented new and useful Improvements in Grain Drying and Salvaging Railway-Cars, of which the following is a specification.

My invention relates to a grain drying and salvaging railway car, and has for its object to provide a car of the kind and for the purpose that is adapted to be quickly transported by rail from place to place for salvaging grain in elevators that have been destroyed or damaged by fire, whereby water-soaked grain may be dried and loaded into cars within a short time and before fermentation begins, and whereby the loss and damage accruing from delay in salvaging and the increased expense of transportation of the water soaked grain to distant local driers is wholly avoided.

A further object is to provide a drying car of the kind that may be transported from elevator to elevator where driers are not installed and be used for both reducing the percentage of moisture in the grain to established grades and for loading the grain into cars from the elevator for shipment.

I accomplish these objects by the construction and combination of parts, as hereinafter described, set forth in the claims, and illustrated in the drawings, in which—

In the drawings 7 designates the body and 8 the trucks of a railway car constructed in accordance with my invention, the body 7 being of any suitable frame work and adjusted to receive, house and carry the drying and cooling mechanisms, supported on the I shaped longitudinal girders 9, hereinafter described.

The body 7 of the car is mounted on the trucks 8 at the forward and rear end portions of the body, the trucks being of any of the standard makes and gage used in railway cars, adapting the car to be hauled over the tracks of standard railways, and is preferably equipped to be hauled as a special car with fast passenger trains, whereby it can be quickly transported from its home station to some railway center, or from its last place of use, over the most direct line of railway to any point where an elevator fire has occurred.

In a central compartment 10 of the car body 7 are located four grain elevators A, B, C and D of the belt bucket conveyer type, each comprising the outer and inner chutes 11 and 12 respectively, the permanent sections *a* and the detachable sections *b*, the detachable boot section *c* connecting the chutes 11 and 12 at the lower end and a hood section *d* connecting them at the top, the boot section *c* being provided with a belt wheel 13 suitably journaled in the crotch of the boot, and the hood section *d*, with the belt wheel 13'. The wheels 13 and 13' of each elevator carry a bucket conveyer belt 14 which revolves in the direction to carry the buckets upright upward through the outer chutes 11 and inverted downward through the inner chutes 12.

The hood sections *d* are smaller compartments of a large hood H which is detachable from the chutes 11 and 12, and extends over the central compartment 10 of the car body 7. The belt wheels 13' of the elevators A and B are fixedly mounted on a common shaft 15 central of one end portion of the hood H.

In like manner the boot sections *c* of the elevators A and B are divisional compartments of a detachable casing G underneath one side of the car body 7, and of the elevators C and D, of a casing G' underneath the opposite side of the car body, and the belt wheels 13 of the elevators A and B are fixedly mounted on a common shaft 16 of the casing G, and of the elevators C and D on the common shaft 16' of the casing G'.

The casings G and G' are provided with side projections 17 open at the top, adapted to be connected to a source of grain supply, whereby grain may be supplied to either one of the sections *c* of the casings G and G'. However, as the parts are shown arranged in the drawings the section *c* of the elevator A is the only one of the sections *c* that can operatively connect the elevators with the source of grain supply.

Forward of and next adjacent to the elevator compartments 10 is the drying compartment 18, on each side of which and forming the sides of the car are located the two equal sections 19 and 19' of the drier, extending from the floor 20 of the car upward to a level with the highest portion of the roof of the end portions of the car.

The sections 19 and 19' of the drier are each composed of a top hopper portion 21, an equal number of grain chutes 22 extending from the hopper portion to the level of the floor 20, the valve controlled common garner 23 for all the chutes 22 extending below the floor and the individual discharge spouts 24 and their discharge valves 25, one for each chute 22.

The chutes 22 of the drier sections 19 and 19' may be of any suitable construction adapted to efficently, uniformly and economically give access of heated air to and through grain passing through the chutes. But preferably I employ the unit construction set forth and described in my pending application, Serial No. 137,529 filed Dec. 18, 1916, for improvement in grain and seed drier, and illustrated in Fig. 8 herein, as best adapted for all kinds of grain and wherein the chutes 22 comprise the equal opposite sides 26 formed of one or more channel bars 26' and cross connected by the common zig zag partitions 27, formed of the alternately reversed angle plates 28, and the angle plate units 29, secured in pairs at their upper ends to the lower ends of the angle plates 28 at the inner angles formed by the plates 28, and their upper portions forming the parallel side portions of the chute and with their lower angle portions converging inward opposite each outer angle of the partitions 27 of the respective chutes 22, whereby each chute 22 comprises a central passage for grain, with an air duct 30 opposite each plate 29 extending horizontally through the drier sections with their openings 31 from the ducts 30 into the grain passage between the lower edges of each plate 29 and the next lower inner angle of the common partitions 27. The ends of the plate 29 have the ears 32 angled therefrom, whereby the plates are secured by bolts to the channel sides 26. The triangular openings at the ends of the ducts of each chute 22 are alternately closed by flanged triangular units 33 on each side, each duct 30 that is closed on the inner sides of the sections 19 and 19' being open at its outer end to form an outlet duct and each duct that is open on the inner side of the sections being closed by a unit 33 at its outer end to form an inlet duct, whereby air that enters an inlet duct passes downward through the opening 31 of the duct and upward through the grain in the passage to and through the opening 31 of the next adjacent outlet duct and escapes to the atmosphere through the outlet duct.

Figure 8:
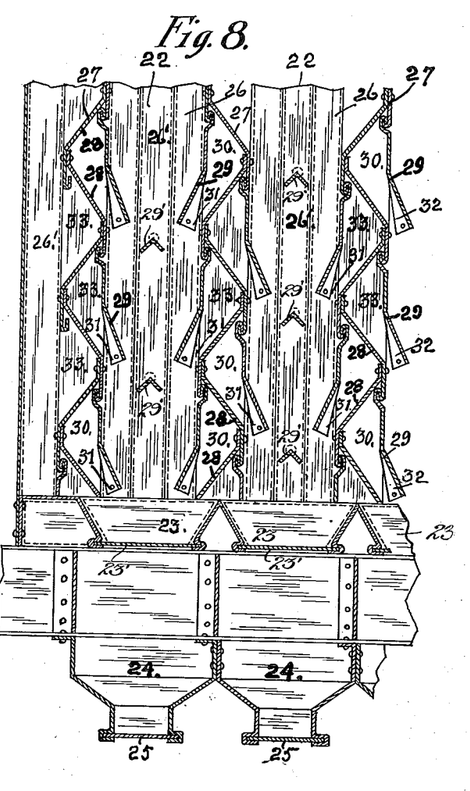
Fig. 8 is an enlarged side view of a broken away lower portion of a drier leg.
Figure 9:
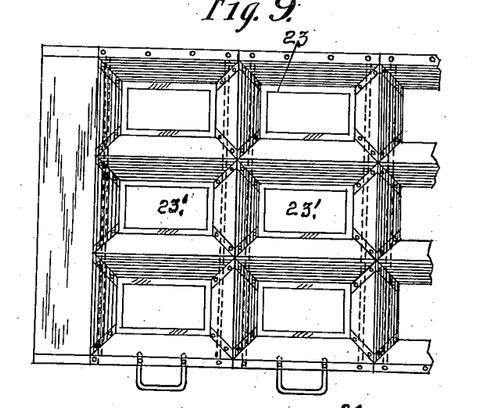
Fig. 9 is a broken away enlarged top view of the garner and speed of flow regulating valves at the lower end of each chute of a drier leg.
Figure 10:
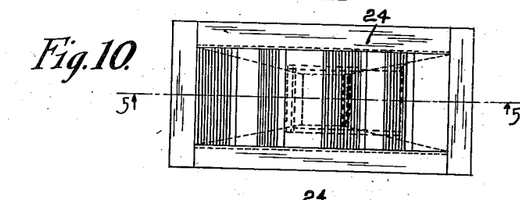
Fig. 10 is a top view of the discharge spout and valve for each chute of a drier leg.
Figure 11:
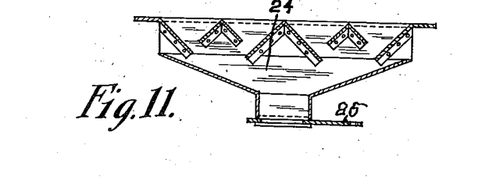
Fig. 11 is a section of the same on line 5—5 of Fig. 10.
Figure 12:
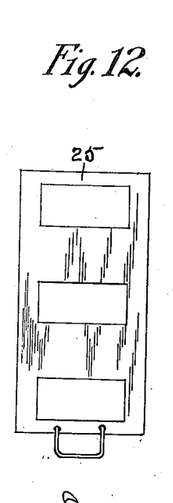
Fig. 12 is a plan view of a speed of flow regulating valve, detached.

The central channel bar 26' of the inner and outer sides 26 of each grain chute 22 is provided just below the end of each opposite pair of plates 29 (as shown in Fig. 8) with angle incuts through the channel bars in which are detachably mounted the ends of the angled deflector plates 29' which extend horizontally and transversely through the chutes just below the lower ends of the plates 29, and which are adapted to divide and deflect the grain in the center portion of each chute 22 outward toward each plate 29 whereby the joint effect of the plates 29 and 29' is to constantly change the grain from the center of the chute toward the outside, and from the outside to the center, and also to prevent the grain in the center of the chute from traveling faster than at the sides, whereby the grain is more uniformly dried and cooled.

On the opposite side of the elevator compartment 10 is the cooler compartment 34

(of equal dimensions as the drier compartment 18) in which are installed the sections 35 and 35' of the cooler, which are duplicates in construction and capacity of the drier sections 19 and 19'.

The cooler sections 35 and 35' are also provided with a common garner 23 (shown in Fig. 8) provided with valves 23' controlling the speed of flow through the chutes 22, and with the individual discharge spouts 24 of each chute 22, controlled by valves 25.

The spouts 24 of both the drying sections 19 and 19' and of the cooler sections 35 and 35' discharge respectively into common screw conveyer troughs 36 and 36', which are installed underneath the car below the discharge spouts 24, when the car is located for use, the trough 36 to receive the grain from sections 19 and 35' and the trough 36' from the sections 19' and 35.

The trough 36 extends through the top portions of boot sections c of the casing G of the elevators A and B between the chutes 11 and 12 of each elevator, and the trough 36' in like manner extends through the boot sections c of the casing G' of the elevators C and D.

Figure 1:
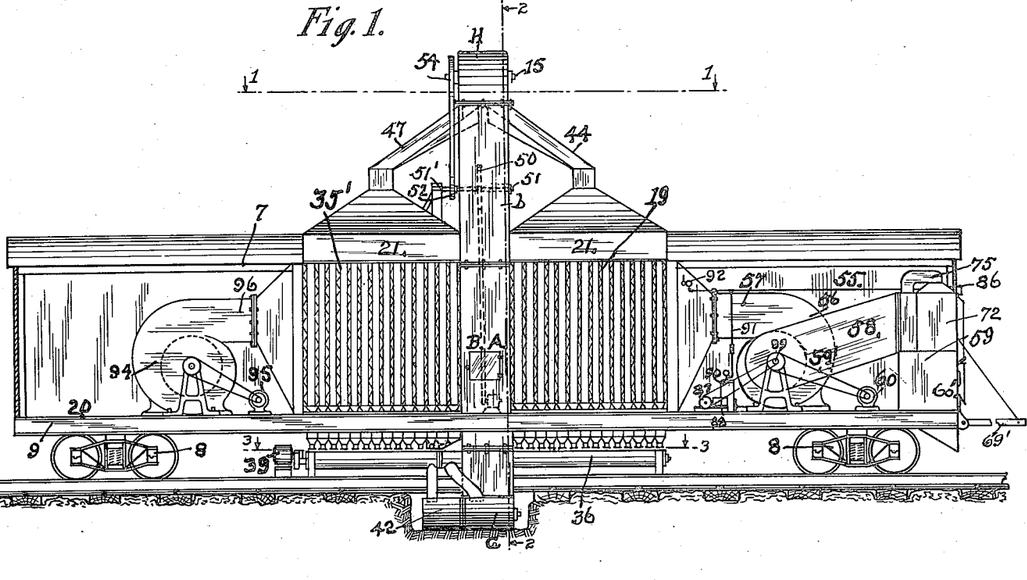
Figure 1 is a side elevation of a grain drying car, constructed in accordance with my invention.
Figure 5:
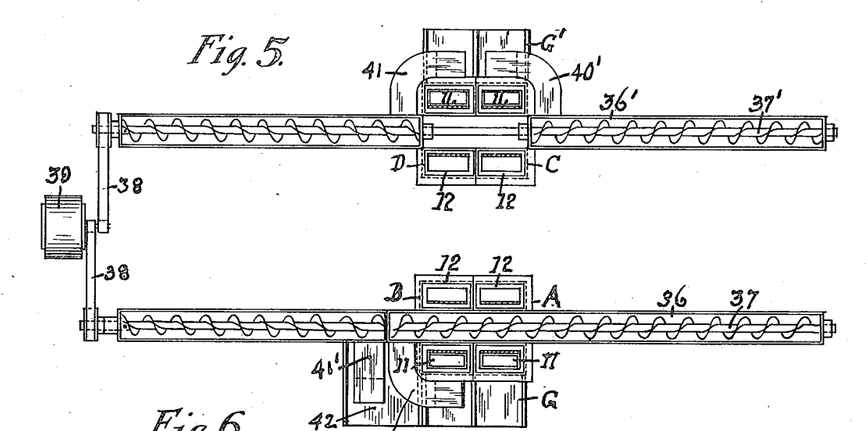
Fig. 5 is a plan view of the grain conveyers and their connection with the elevators.
Figure 6:
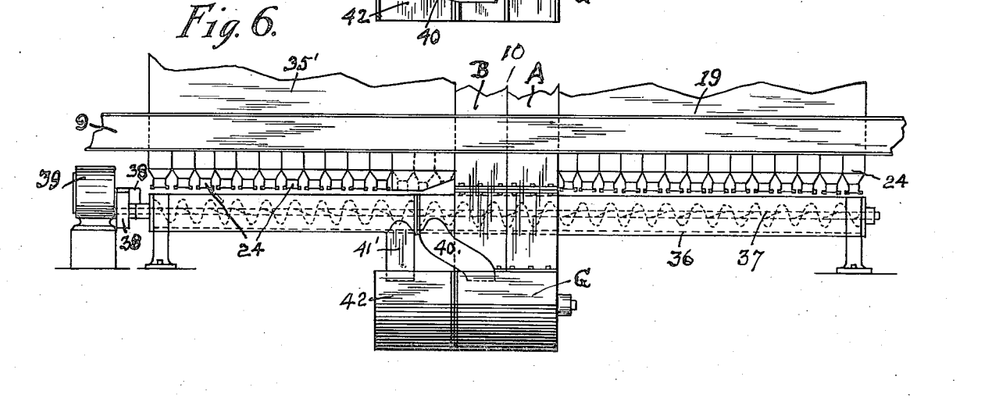
Fig. 6 is a broken away side view of the same.
Figure 7:
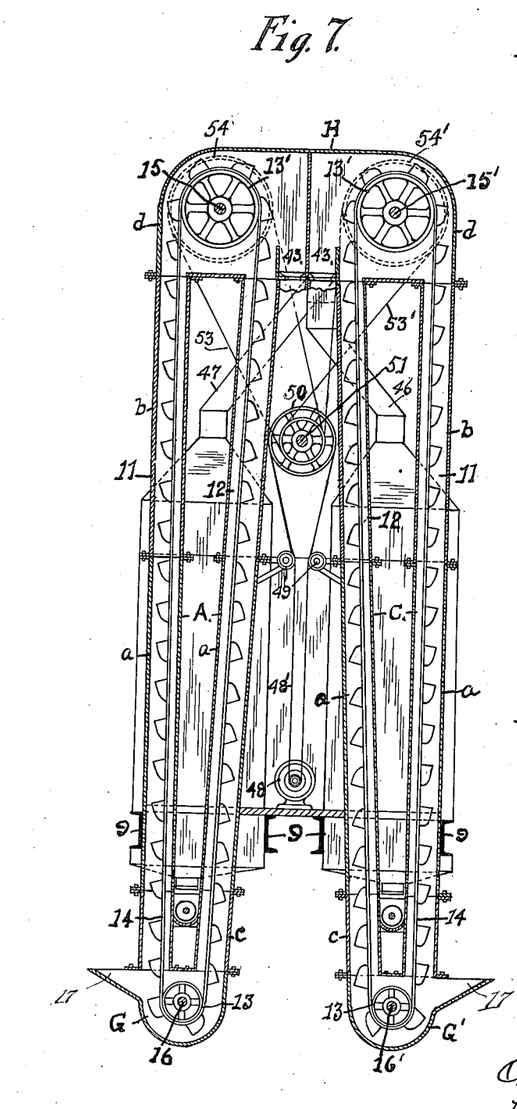
Fig. 7 is an enlarged section of Fig. 1 on line 2—2.

The troughs 36 and 36' each have journaled lengthwise therein the conveyer shafts 37 and 37' respectively, which are each connected by belts 38 with a motor 39 installed beneath the car, as shown in Figs. 1, 5 and 6.

Beneath the spouts 24 of the drier sections 19 and 19' the conveyer shafts 37 and 37' each are provided with a left hand helical conveyer blade, whereby the grain delivered from the spouts into the troughs 36 and 36' from the drier sections are respectively conveyed to the casings G and G', and delivered respectively through spouts 40 and 40' into boot sections c of elevators B and C respectively.

Beneath the spouts 24 of the cooler sections 35 and 35' the shafts 37 and 37' are provided, each with a right hand helical conveyer blade, whereby the grain delivered from the spouts 24 of the cooler sections 35 and 35' is respectively delivered through spouts 41 and 41' respectively into the boot section c of elevator D and the delivery casing 42, which latter is adapted to be connected by a car loading mechanism (not shown) with empty grain cars, whereby the grain, as fast as it is dried and cooled is loaded into the car for shipment.

The hood section d of each elevator has a receiving hopper 43 inward from and alongside of the top portion of the chute 12 of each elevator, into which the buckets of the belt 14 of each elevator, as they pass over their respective belt wheels 13' empty their loads of grain, and the hoppers 43 of the elevators are respectively connected as follows:—the hopper 43 of the elevator A, by a discharge spout 44 with the hopper portion 21 of the drier section 19; the hopper 43 of the elevator B by a discharge spout 45 with the hopper portion 21 of the drier section 19'; the hopper 43 of the elevator C by a discharge spout 46 with the hopper section 21 of the cooler section 35; and the hopper 43 of the elevator D by the discharge spout 47 with the hopper portion 21 of the cooler section 35', whereby the grain carried up by elevator A is discharged into the hopper of section 19 of the drier, through the spout 44. The grain discharged from section 19 of the drier is delivered to section c of elevator B by the conveyer 37 and carried up by the elevator B and discharged through the spout 45 into section 19' of the drier. The grain discharged from the section 19' of the drier is delivered by the left hand conveyer 37 to the boot section c of the elevator C and carried up by the elevator C and delivered through the spout 46 to the hopper 21 of section 35 of the cooler.

The grain discharged from the cooler section 35 is delivered by the right hand conveyer 37' to the boot section c of the elevator D and is carried up by the elevator D and delivered through the spout 47 to the hopper 21 of the cooler section 35', and is discharged from the spouts 24 of that section, and delivered by the right hand conveyer 37 into the receiver 42 for delivery by the loading mechanism (not shown), into grain cars for shipment.

To operate the elevators there is provided an electric motor 48 which is located in the elevator compartment 10 and which is connected by a belt 48' running between idlers 49 with a main pulley 50, located above the car body 7 and journaled by a shaft 51 on a support 51' attached to the detachable sections b of chutes 12 of the elevators and the car body. On the shaft 51 is mounted a smaller pulley 52 which is connected by an uncrossed belt 53 with a pulley 54 mounted on the shaft 15 on which the elevator wheels 13' of elevators A and B are mounted. The pulley 52 is also connected by a crossed belt 53' with the pulleys 54' which is mounted in the shaft 15', on which are mounted the pulleys 13' of the elevators C and D.

In the end compartment 55 of the car body 7 is provided a blower 56 which is connected by an air delivery duct 57 with the air space between the drier sections 19 and 19' and with an air receiving duct 58 connected with an air heating and tempering furnace 59 in the compartment 55. The blower 56 is connected also by belt 59 with an electric motor 60 adapted to operate the blower.

Figure 13:
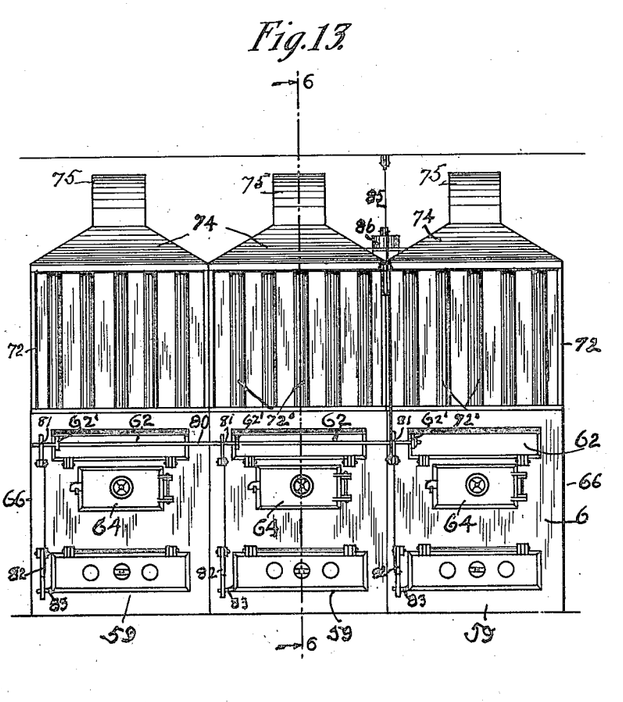
Fig. 13 is a front elevation of a drier furnace.
Figure 14:
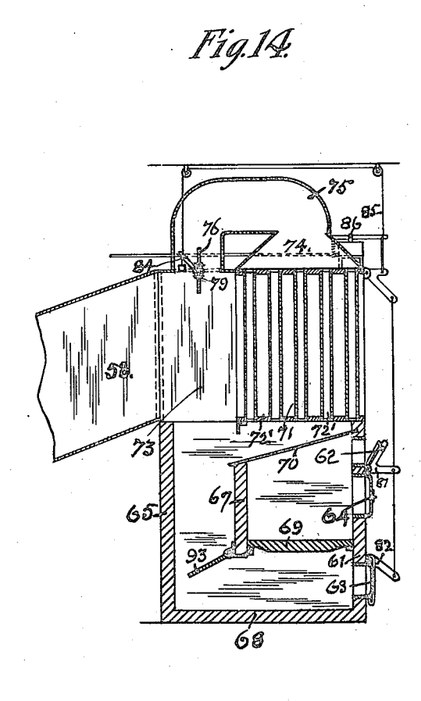
Fig. 14 is a section of the same on line 6—6 of Fig. 13.
Figure 15:
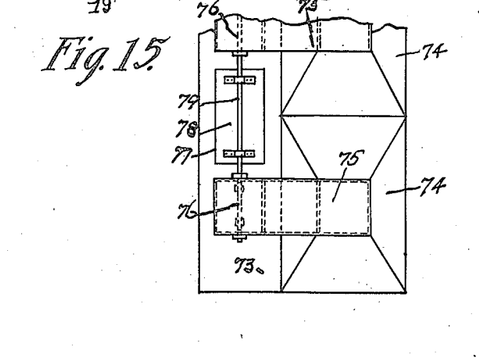
Fig. 15 is an enlarged detail of the air mixing chamber of the furnace.

The furnace 59 may be of any type adapted to heat the air delivered to the blowers 56, but preferably I employ a type of heater similar to the one shown and described in a pending application, Serial No. 148,700, filed by me of date Feby. 15, 1917, and as illustrated in Figs. 13 and 14 herein, wherein the heated air and gases of combustion are mingled with a heated volume of air drawn by the blower through a heating chamber of the furnace and tempered with air from the atmosphere, as required to produce and maintain an air supply under pressure and at a uniform predetermined temperature for use in the drier sections.

To accomplish these objects I preferably use in my car drier a modified form of the heater shown and described in my said pending application, Serial No. 148,700, comprising a plurality of equal units 59, each comprising a rectangular combustion chamber 60', having the front wall 61 provided with the upper draft door 62, the lower draft door 63 and the feed door 64, between the draft doors, the back wall 65, the side walls 66, the bridge wall 67, between and parallel with the front and back walls and supported by the side walls 66 above the bottom 68, a grate 69 supported by the bridge and front walls below the level of the feed door and above the lower draft door, an inclined top closure plate 70 extending from side to side and from the top of the bridge wall to the front wall above the upper draft door; an air heating chamber 71 mounted on the combustion chamber, comprising a rectangular flue box 72 having a multiplicity of upright flues 72' with the flues in staggered rows, said flue box being open at front and back and closed at the sides and also at the top and bottom excepting the flues, and a common air mixing chamber 73 for the units 59 mounted on the combustion chamber behind the flue boxes, said chamber 73 being closed at the ends, top and bottom and open at the front and connected with the flue boxes and at the rear by the receiving duct 58 with the blower 56, a hood 74 mounted on the flue box and having an arched flue 75 connecting the hood with the air mixing chamber 73, and a damper 76 adapted to control the flue 75.

The top of the mixing chamber 73 between the flues 75 of the units 59, is also provided with draft openings 77, which are each provided with a controlling damper 78, and the dampers 76 and 78 are so relatively mounted on a common rod 79, that when the dampers 76 are fully opened, the dampers 78 are closed, and vice versa, and when either is partially opened the others will be opened in a like degree.

The upper draft doors 62 of the units 59 each have fixed thereto an arm 62' which are connected by a common rod 80, having fixed thereon a bell crank 81 for each door 62, and the lower draft doors 63 each have a bell crank 82 connected by an arm 83 fixed on the doors 63 in a relatively reversed position to the arms 62' of the doors 62 and the bell cranks 81 and 82 are so connected that when the bell cranks 81 are moved to open the upper draft doors the lower draft doors are closed, and vice versa.

The common rod 79 is also provided with a bell crank 84 so relatively adjusted and connected with a bell crank 81 by the common connection 85, that when the upper draft doors 62 are fully opened, the dampers 78 are closed and the dampers 76 are fully opened, and vice versa.

The common connection 85 is operatively connected to the piston of an air motor 86 adapted to be yieldingly held normally in one position by a spring (not shown), and to be moved to close the upper draft doors 62 and the dampers 76, when air under a predetermined pressure is admitted to the air motor, and thereby open the lower draft doors 63 and the dampers 78.

An air compressor 87 connected by a belt 88 with a pulley 89 on the shaft of the blower, is adapted to store up a supply of compressed air in a receiver 90 that is connected by a pipe 91 with the air motor 86. A valve (not shown) controlling the pipe 91 is adapted to be opened by a thermostat 92 installed in the drier compartment 18, at a predetermined maximum temperature therein and to close the valve by a predetermined minimum temperature, whereby the upper draft doors and the dampers 76 of the heater will be closed and the lower draft doors and the dampers 78 opened when the temperature in the drier compartment has reached the predetermined maximum, and their positions will be reversed when the temperature in the drier compartment has reached the minimum, thereby automatically maintaining the temperature of the air in the drier at degrees between the maximum and the minimum.

To heat the unit 59, hard coal or coke is supplied to the grates of the units through the feed doors 64 which are kept normally closed.

Figure 2:
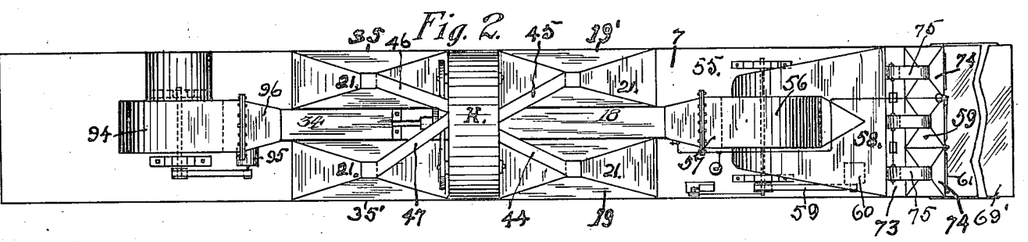
Fig. 2 is a plan view of the same.
Figure 3:
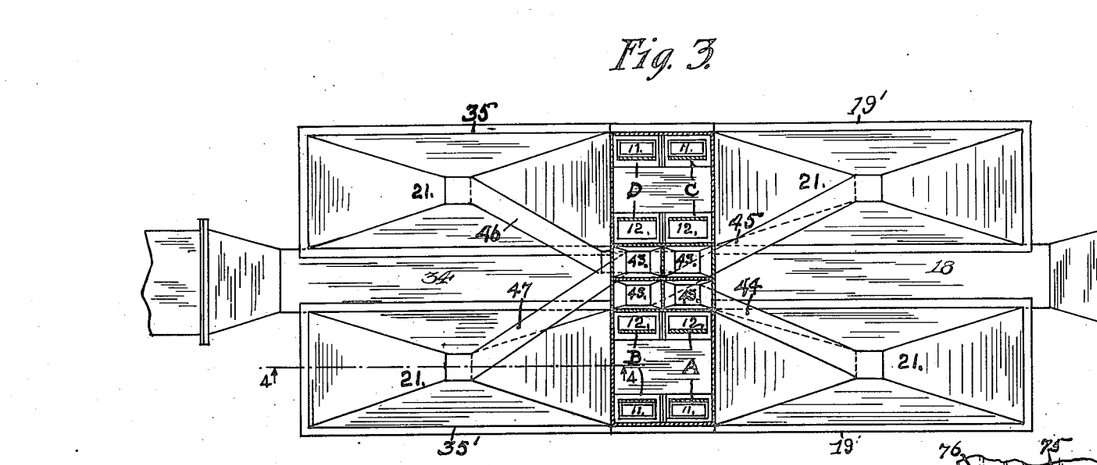
Fig. 3 is an enlarged plan view of the central portion of the car, sectioned on lines 1—1 of Fig. 1.
Figure 4:
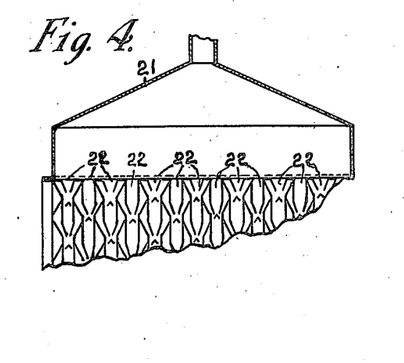
Fig. 4 is an enlarged side view of a broken away top portion of one leg of the drier and its garner hopper.
Figure 16:
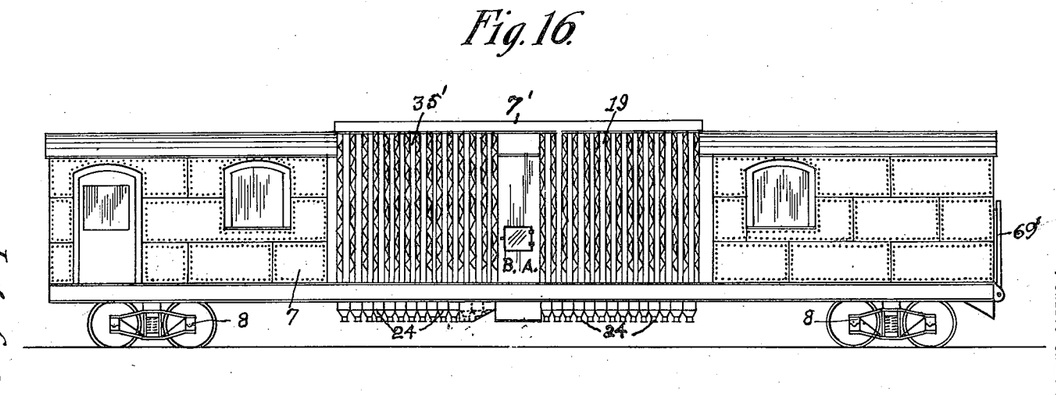
Fig. 16 is a view in side elevation of the drier car with the detachable sections of the conveyers and elevators removed, and in condition for transportation.
Figure 17:
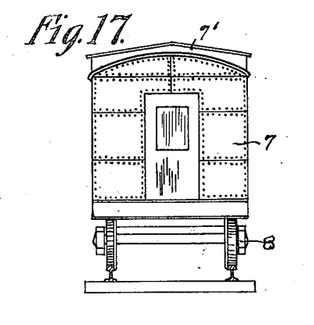
Fig. 17 is a view in front end elevation of the car in condition for transportation.
Figure 18:
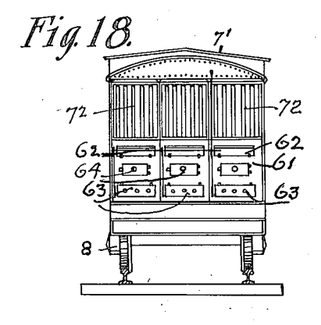
Fig. 18 is a view in rear end elevation of the same.

The front wall 69 and the open front of the flue boxes 72 of the units 59 substantially constitute the front end of the car body 7, which is provided with a hinged platform 69' that when the car is being used for grain drying is supported in a horizontal position by suitable supports (as shown in Figs. 1 and 2), for feeding the furnaces, and is raised and secured in vertical position when the car is dismantled for transportation, as shown in Fig. 16. In the latter condition, after the removal of the detachable hood H, the elevator sections 3 and the hoppers of the drier and cooler sections, a suitable flat roof 7' is placed in position covering the compartments 10, 18 and 34.

Thus constructed, it will be seen that when the blower is started its suction will cause a draft through the open upper draft doors 62 downward through the grates, around and under the baffle plates 98, and upward over the bridge walls above the inclined top plates, and up through the flues 72; and through the arched flues 75 into the mixing chamber 73 at the same time that air is drawn through the flue box, whereby the heated air and gases of combustion are mixed with the air drawn through the flue boxes.

Should the temperature in the drier rise to the maximum the upper draft doors and the damper 76 will be automatically closed and the lower draft doors and the damper 78 will be opened, whereby the draft through the furnaces will be from below the grate, and reduced to the capacity of draft holes in the dampers, which are provided to prevent all draft through the furnaces from being cut off.

By using a heater of the kind described I utilize substantially all the heat produced by the fuel burned, and the carbonic gases mingled with the air operate to destroy all parasitical animalculæ that infect the grain, whereby the grade of the grain is raised.

In the opposite end of the car 7 there is installed a blower 94 and an electric motor 95 to operate the blower 94, which is connected by a duct 96 with the air space of the cooler compartment 34.

Figure 19:
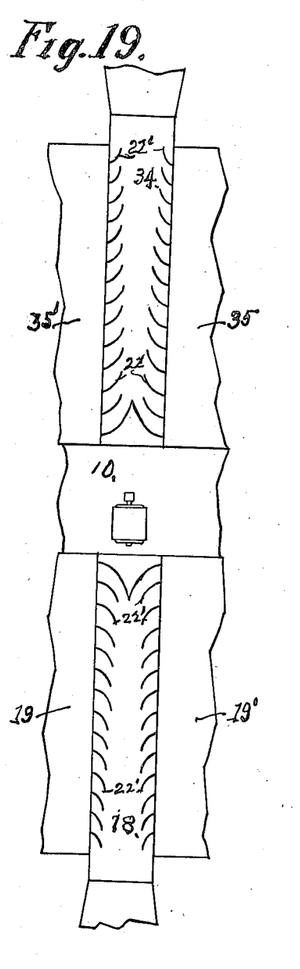
Fig. 19 is a diagrammatic view illustrating the arrangement of baffle plates in the air chamber between opposite legs of the drier and cooler, for equally distributing the air to each grain chute.

The air spaces between the drier sections 19 and 19' and the cooler sections 35 and 35' respectively are preferably provided (as diagrammatically shown in Fig. 19) with the graduated series of baffle plates 22' adapted to equalize the air delivered to the respective compartments 18 and 34 by the blowers 56 and 94 respectively, between the grain chutes 22 of the drier and cooler sections, by intercepting a portion of the air opposite each chute 22 and directing it through the inlet ducts 30 of each chute, whereby it will be seen that the air delivered by the drier and cooler blowers into the respective compartments 18 and 34 will pass out equally through the opposite sections of the drier and cooler respectively, and that the air entering the inlet openings of the inner sides of the drier and cooler sections can only reach the openings of the outer sides of the section after passing from the inlet ducts downward through the openings 31 into and upward through the grain column to the outlet ducts, whereby the grain in each chute is rapidly and uniformly dried and cooled.

While I have heretofore employed the principles of construction embodied in the drier and cooler sections herein shown and described, in constructing stationary grain driers, in my present invention, I have reorganized and adapted my grain driers to the restricted conditions necessarily involved in installing it in a railway car, and in adapting it to perform all the functions necessary to the handling and drying of grain at elevators where such facilities have been destroyed or made unavailable for use, by fire or otherwise.

What I claim to be new is—

1. The combination with a car body, provided with trucks adapting it to be transported over railways and provided with a grain drying compartment, and an elevator compartment, of a grain drier comprising a first and a second section installed in the drying compartment on opposite sides thereof with an inclosed air space between said sections, each section comprising a receiving hopper and a plurality of vertically disposed drier chutes, each comprising a vertical grain passage and horizontally disposed air ducts on each side of the grain passage and having openings into the passage, and alternate air ducts having openings into the air space between the sections, and their outer ends closed and the remaining ducts having their inner ends closed and their outer ends open to the atmosphere, an elevator in the elevator compartment adapted to receive grain from a grain supply and to deliver the grain to the hopper of the first drier section, a second elevator in the elevator compartment adapted to receive grain from the first drier section and deliver it to the hopper of the second drier section, means to deliver grain from the second drying section to the receiver of a loading mechanism, a blower installed in the car and connected to the air space in the drier compartment, a heater installed in the car and adapted to deliver heated air to the blower, and means to operate the elevators and the blower.

2. In a grain drying and salvaging railway car, the combination with a car body mounted on trucks and adapted to run on standard railway tracks, and having a drying compartment, and an elevator compartment, a pair of drier sections in the drier compartment, each comprising a receiving hopper, a plurality of grain chutes, transverse inlet and outlet air ducts, and valve controlled discharge spouts, said sections installed as sides of the drying compartment, with an air space between the sections, an elevator in the elevator compartment for each drier section, one adapted to receive grain from a grain supply and deliver it into the hopper of a drier section, and a second elevator adapted to receive the grain discharged from the first drier section and deliver it into the hopper of the second drier section, means to deliver the grain discharged from the second drier section to the receiver of a loading mechanism, a blower installed in the car and adapted to deliver air into the air space of the drier compartment, a heater installed in the car and adapted to deliver heated air to the blower, means to automatically regulate the temperature of the air delivered to the blower, and means installed in the car for operating the elevators and the blower.

3. A grain drying and salvaging car, comprising railway trucks, and a car body mounted on the trucks, said car body comprising a central elevator compartment, a drier compartment on one side of the elevator compartment and a cooler compartment on the other side of the elevator compartment, a drier in the drier compartment and a cooler in the cooler compartment, said drier and cooler each comprising two equal sections with an inclosed air space between, and each section comprising a receiving hopper, a plurality of vertically disposed grain chutes, and a plurality of horizontally disposed air ducts on each side of each grain chute intersecting the chutes, alternate air ducts of each chute being closed at their outer ends and open at their inner ends and vice versa, and means to control and regulate the speed of flow of grain through the chutes, a blower in each end compartment of the car, said blowers being respectively connected to the air space between the sections in the drying and cooling compartments, elevators in the elevator compartment, one for each drier and cooler section, one elevator being connected with a source of grain supply, each elevator being connected with and adapted to deliver grain to the hopper of its respective drying or cooling section, means to convey and deliver the grain discharged from each section excepting the last, to the elevator of the next succeeding section in a predetermined order, and of the last section to the receiver of a loading mechanism, a heater connected to the blower of the drying section and adapted to deliver heated air thereto and means to simultaneously operate the blowers, the elevators and the conveyers, whereby grain from the source of supply is continuously and consecutively passed through the drying and cooling sections in a predetermined order to a loading receiver.

In testimony whereof I have hereunto set my hand at Toledo, Ohio, this 23rd day of June, 1917.

OLIVER W. RANDOLPH.